United States Patent Office 3,517,698
Patented June 30, 1970

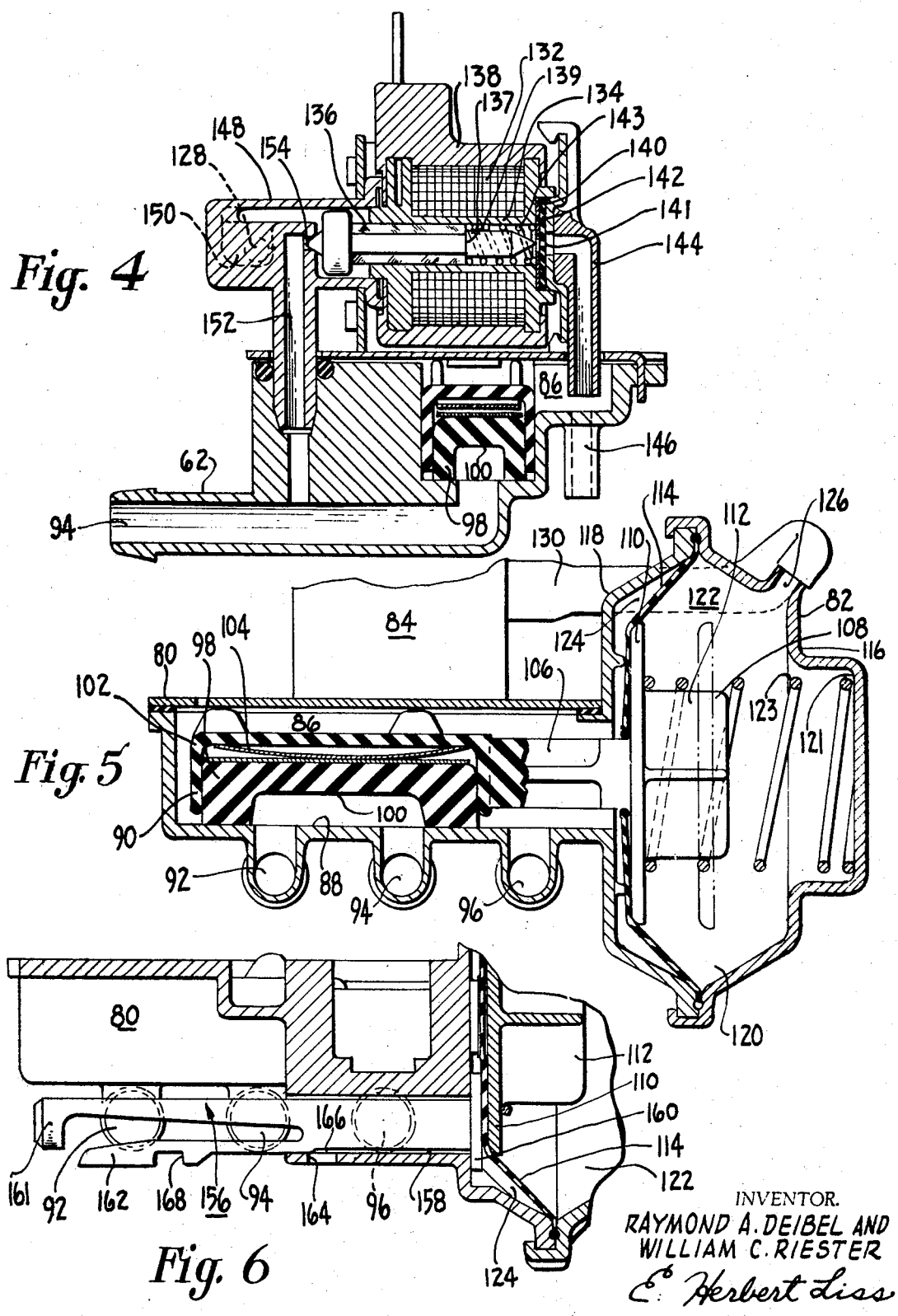

3,517,698
PNEUMATIC ACTUATOR CONTROL SYSTEM
Raymond A. Deibel, Cheektowaga, and William C. Riester, Williamsville, N.Y., assignors to Trico Products Corporation, Buffalo, N.Y.
Original application July 20, 1966, Ser. No. 566,521, now Patent No. 3,402,288, dated Sept. 17, 1968. Divided and this application Apr. 23, 1968, Ser. No. 739,596
Int. Cl. F16k 11/06, 35/06
U.S. Cl. 137—625.64                              1 Claim

ABSTRACT OF THE DISCLOSURE

A retractable headlamp system for motor vehicles utilizing an electro-pneumatic pilot valve for controlling a servo-valve. The servo-valve in turn controls application of vacuum from a source including the engine intake manifold and a vacuum storage tank to differential pressure actuated power units. Through a linkage system the power unit moves the headlamp assembly from operative to retracted position and vice versa. Venting occurs through the pilot valve. A manual switch simultaneously energizes the headlight circuit and the solenoid of the pilot valve. A manual mechanical actuator is provided to operate the servo-valve in case of electrical failure.

---

This is a division of application Ser. No. 566,521, filed July 20, 1966, now U.S. Pat. No. 3,402,288, issued Sept. 17, 1968.

The present invention relates to a valve assembly for an electro-pneumatic control system for operating movable auxiliary equipment in motor vehicles and, more particularly, to a valve assembly for a control system for actuating a plurality of elements in synchronism.

Although it will be apparent that the invention may be utilized with numerous devices where simultaneous operation is required, the invention is illustrated by way of example for use with retractable headlamps in motor vehicles or for retractable headlamp shields. This is an example of operating elements which require simultaneous and rapid actuation.

Retractable headlamps and retractable headlamp shields have been provided in motor vehicles and it is apparent that for safety purposes a single operation of a manual control must simultaneously retract the shields or place the retractable headlamps in operative position and at the same time energize the lighting circuit. Shielding the headlamps from wheel spray and other accumulation of dirt on the lenses is an important safety feature, but it is essential that when such a safety feature is provided that the headlamps be movable into operative position rapidly and without fail or that the shields be retracted immediately when the headlamps are energized.

A unique, rapidly-acting, fail-safe system has been provided by the valve assembly of the present invention which is energized by the source of power provided for illumination of the headlamps. A pilot valve controls differential pressure in a pneumatic system for powering the movement of a servo-valve or porting valve which in turn permits a greater volume of fluid flow to actuate a pneumatically responsive power unit for any workload desired. In the example illustrated herein an electrically energized control opens a pilot valve port to actuate the remotely controlled porting or servo-valve. The servo-valve is diaphragm actuated to direct the flow of fluid power to a pneumatic power unit. The pneumatic power unit is used in turn to rotate the headlamp shields or the retractable headlamps on an automobile.

The electro-pneumatic operating mechanism may be applied in the same manner as utilized here for operating any pneumatic power unit for any purpose. In the instant case, where safety demands operation even with power failure, the control combines a manual release which is operable without energization of the electrical system to provide pneumatic operation. The manual control will position the servo-valve so as to effect communication between a source of fluid pressure and the power unit to hold the headlamp shields or the retractable headlamps in operating position. Thus, the utility of the headlamps is safeguarded with full disregard of the electrical system or the pilot valve system. A standard headlight switch when turned to on position energizes the pilot valve simultaneously with lighting of the headlamps.

The remotely controlled pilot and servo-valves form a unitized element remotely disposed with respect to the operator controlled manual actuator or headlight switch. The pilot valve-servo valve unit may be placed in a position close to the headlights where connections of short length can be provided for supplying vacuum from an adjacent power source to the power units. This permits rapid operation. Only a single electrical lead from the manual control to the pilot valve is required to substantially simultaneously actuate the pilot valve and servo-valve combination.

The principal object of the present invention is to provide an improved fail-safe, economical solenoid controlled electro-pneumatic system for actuating auxiliary equipment in motor vehicles.

A further object of the invention is to provide an electrically energized, solenoid actuated, pilot valve-servo valve combination for controlling the power source for a pneumatic system which is utilized to actuate retractable headlamps and retractable headlamp shields.

Other objects and advantages of the invention will be apparent from the following detailed description taken in connection with the accompanying drawings in which:

FIG. 4 is a sectional view of the valve unit taken on line IV—IV of FIG. 3;

FIG. 5 is a sectional view taken on line V—V of FIG. 2; and

FIG. 6 is a sectional view taken on line VI—VI of FIG. 2.

Figures 1, 2, 3:
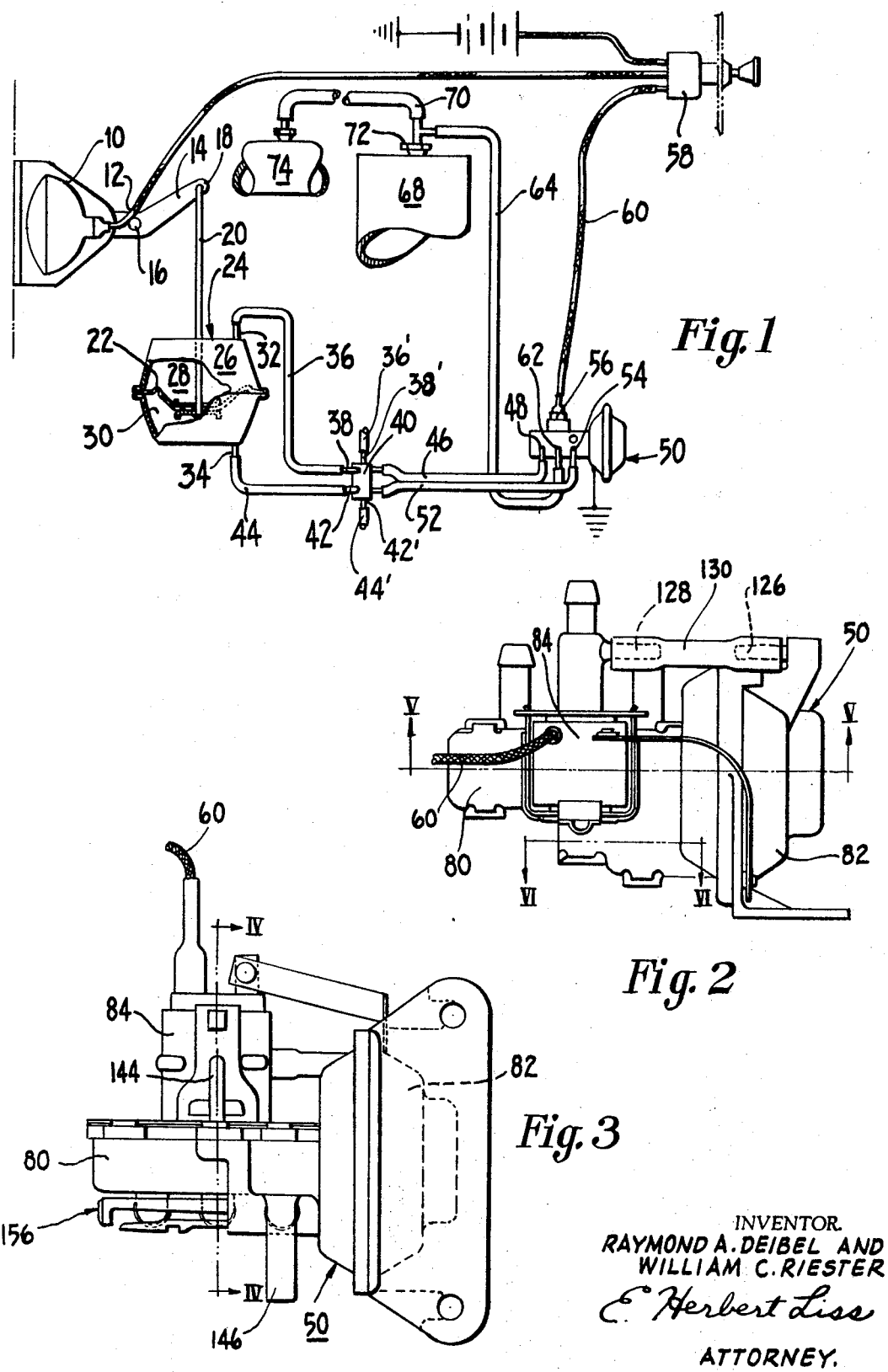
FIG. 1 is a schematic diagram of a preferred embodiment of the control system of this invention.
FIG. 2 is an elevational view of the pilot valve-servo-valve combination of this invention.
FIG. 3 is an elevational view from another direction of the valve unit illustrated in FIG. 2.

Briefly, the invention comprises a valve assembly for a control system illustrated by way of example for use with a pair of retractable headlamp shields, each of which is connected by a linkage to the diaphragm of a fluid pressure operated power unit. A vacuum source is provided through a servo-valve, which servo-valve directs a fluid pressure differential across the diaphragm of the servo-motor selectively in one direction or the other. A solenoid operated pilot valve is energized by a standard headlight switch or manual control which in turn actuates the servo-valve. The headlight circuit is energized simultaneously.

In FIG. 1 there is shown a retractable headlamp shield 10 for covering the headlamp when not in use having one arm 12 of a bell crank lever 14 affixed thereto. The bell crank lever is pivoted at 16 and has its other arm 18 connected by a link 20 to the diaphragm 22 of a pneumatic power unit 24. The power unit 24 comprises a housing 26 having a pair of symmetrical housing halves crimped, welded or secured together in any suitable manner. A double acting diaphragm 22 has its periphery clamped between the adjoining edges of the housing halves to provide a pair of chambers 28 and 30. The chamber 28 has a nipple 32 extending therefrom and the chamber 30 has a nipple 34 extending therefrom. A conduit 36 connects the chamber 28 through nipple 32 to a nipple 38 of a six-way connector 40. The chamber 30 is connected to a nipple 42 of the six-way conduit connector 40 by a conduit 44 through nipple 34. Conduits 36' and 44' communicate with chambers on a power unit of the second headlamp set corresponding to chambers 28 and 30, respectively, through nipples 38' and 42' of the six-way conduit connector 40. Communicating with conduits 36 and 36' through connector 40 is a conduit 46 which is connected to a nipple 48 of the servo-valve 50. Connected to conduits 44 and 44' through the connector 40 is a conduit 52 connected to a nipple 54 of servo-valve 50. The servo-valve 50 includes a solenoid operated pilot valve 56, the solenoid being connected to the manual switch 58 through a lead 60. The manual switch 58 actuates the lighting circuit as well as the solenoid valve 56. A nipple 62 of the servo-valve 50 is connected through conduit 64 to a vacuum source 66. The vacuum source may comprise a vacuum storage tank 68 supplied by a source as, for example, the intake manifold 74 of a motor vehicle engine. A conduit 70 is connected at one end through a check valve 72 to the storage tank 68 and at its other end to the intake manifold 74 of a motor vehicle. The check valve serves to supply the headlamp system either from the storage tank 68 or directly from the manifold 74, whichever has the greater vacuum. The servo-valve 50 is illustrated in FIGS. 2, 3, 4, 5 and 6.

The servo-valve assembly 50 comprises a valve housing 80, a diphragm housing 82 disposed at one end of the valve housing 80 and a solenoid operated pilot valve assembly 84 secured to the valve housing 80. The valve housing 80 of the servo-valve assembly 50 encloses a manifold chamber 86 having a valve seat 88 receiving a slide valve assembly 90. The nipples 48, 62 and 54 connect the manifold chamber 86 through ports 92, 94 and 96, respectively, with the chamber 28, the vacuum source 66 and the chamber 30 of the power unit 24, respectively. Disposed on the valve seat 88 is a porting valve 98 having a recess 100 which is of such dimensions as to straddle either port 92 and port 94 in one position or port 94 and port 96 in another position, thereby to place either chamber 28 or chamber 30 of the power unit 24 in communication with the vacuum source. The porting valve 98 is positioned in a valve retainer 102 which is recessed to receive the porting valve 98. A leaf spring 104 is disposed between a wall of the porting valve 98 to bias the porting valve 98 against the valve seat 88 with the recess 100 straddling the ports. The porting valve housing 80 communicates at one end with the diaphragm housing 82 and is secured thereto. A stem 106 is provided on the porting valve retainer 102 and extends into the diaphragm housing 82. The stem 106 includes at its free end an enlarged portion 108 which has a flange 110 and a spring guide 112. The stem extends through a diaphragm 114 disposed in the diaphragm chamber. The stem 106 extends through the diaphragm 114 and the flange 110 engages the side of the diaphragm remote from the porting valve housing 80 in sealing engagement therewith. The diaphragm housing 82 comprises a pair of housing halves 116 and 118 crimped together to form a chamber 120 separated by the diaphragm 114 into compartments 122 and 124. The periphery of the diaphragm 114 is crimped between the flanged edges of the housing halves 116 and 118. The housing halves 116 and 118 are illustrated by way of example as being crimped together. The housing half 116 is formed at one side thereof with a spring retaining seat 121 which receives a spring 123. The spring 123 at its other end is retained on spring retainer 112 and seats on flange 110, thus biasing the diaphragm to the left, as shown in FIG. 5, thereby moving the porting valve 98 to a position wherein the recess 100 connects ports 92 and 94. In this position the port 96 serves as a vent. A port 126 is provided in the chamber 122 which communicates with a port 128 in the solenoid assembly or pilot valve 84 through a conduit 130.

The solenoid assembly 84 comprises a solenoid coil 132 on a hollow core 134 of insulating material. An armature 136 in the form of a double-ended needle valve is slidably disposed within the hollow core. The solenoid coil 132 may be housed and insulated in any suitable manner as, for example, by molded encapsulation as shown in FIG. 4 or in any other suitable or desirable manner. One end of the hollow core 134 is closed by a closure 140 having a central aperture forming a port and valve seat 141. The closure 140 is recessed and a flexible centrally apertured seal 142 is disposed within the recess to form tight sealing engagement when the armature or valve 136 is seated in the port 141. The port 141 communicates with a vent nipple 144 in communication with the porting valve chamber 86 and a nipple 146 which is vented to atmosphere. At its other end the core 134 is closed by a manifold porting element 148 having a chamber 150 which communicates through port 128, conduit 130 and port 126 with chamber 122 of the servo-valve assembly 50. A conduit 152 is provided in the manifold element 148 which communicates with source port 94 of the porting valve assembly 80 and is separated from the chamber 150 by a port and valve seat 154. The armature or needle valve 136 in one position seats on the port and valve seat 154 to isolate the source port 94 and conduit 152 from the chamber 150. In this position the port 141 serves as a vent as will hereinafter be explained.

The valve 136 has a reduced diameter end portion 137 at its end adjacent the port 141 forming a shoulder 139 facing the port 141. The shoulder 139 forms a seat for a coil spring 143 which receives the reduced diameter end portion 137 of the valve 136. The other end of the spring is seated against the closure 140 thereby biasing the valve 136 to a position where it seats on and closes port 154. When the solenoid 132 is energized the valve 136 is drawn against the bias of the spring to a position where it closes the port 141 and opens the port 154.

In FIG. 6 there is shown a safety device 156 for maintaining the slide valve in position to hold the retractable shield open in case of failure in the electrical system, in the manual control, or in the diaphragm chamber. This safety device is in the form of an elongated latch slidable in a guideway 158 adjacent the porting valve housing 80. The latch is an elongated member which includes an enlarged head portion 160 at one end which engages diaphragm 114 and flange 110. At its other end it has a push button 161 which can be depressed to move the diaphragm 114 and the enlarged head portion 110 of the porting valve retainer 102 to a position which causes the porting valve 98 to effect communication between ports 94 and 96, thereby porting vacuum to chamber 30 of power unit 24. This causes the retractable headlamps or the shield to remain in open position until the safety latch is released. A resilient finger 162 extends longitudinally parallel to the latch element 156 and is resiliently stressed to a locking position. A shoulder 164 of an opening 166 engages a shoulder 168 on the resilient member 162 to maintain the latch element 156 in its inward position whereby the slide valve is in position to effect communication between ports 94 and 96. The resilient finger 162 can be moved laterally by manual operation to release engagement between shoulders 164 and 168 whereby the spring 123 drives the latch to its outward unlatched normal position.

The manual switch 58 includes contacts for operating the headlighting circuit. The connector 60 is connected in parallel with the headlight circuit although, in accordance with the broader aspects of the invention, it may be in series therewith or separate contacts may be provided on the switch. Thus, when the manual headlight switch 58 is turned to the on position, the solenoid rod 132 is energized. Energization of the solenoid coil 132 draws the valve or armature 136 against the bias of spring 143 to a position whereby port 141 is closed and port 154 is opened. When port 154 is opened, vacuum from source 66 is applied through port 94, port 152, port 154, chamber 150, port 128, conduit 130 and port 126 to chamber 122 which draws the diaphragm 114 to the right, as viewed in FIG. 5, against the bias of spring 123. Chamber 124 of diaphragm chamber 82 is in communication with chamber 86 of porting valve housing 80 and vents through chamber 86 and port 146. The diaphragm acting on flange 110 draws the porting valve retainer 102, together with porting valve 98, to the right, as viewed in FIG. 5, to connect ports 94 and 96 through recess 100 of porting valve 98. Thus, vacuum is applied from source 66 through conduit 64, port 94, chamber 100, conduit 96, conduit 52, connector 40, conduit 44 and port 34 to chamber 30 of power unit 24. Chamber 28 of power unit 24 vents through conduit 36 to nipple 38, connector 40, conduit 46, port 92, chamber 86 and port 146. The diaphragm of power unit 24 is drawn downwardly, as viewed in FIG. 1, together with the link 20. Downward movement of the link 20 causes the bell crank lever 14 to pivot about its axis at 16 in a clockwise direction, as viewed in FIG. 1, thereby raising the headlamp shield to a retracted position. Thus, by one operation of the manual switch 58, the shield unveils the headlamp and turns the light on.

When it is desired to turn the lights off, the manual switch 58 is operated, opening the circuit to the headlights as well as the circuit through connector 60 thereby de-energizing the solenoid coil 132. The spring 143 of servo-valve assembly 84 moves the armature 136 to the position where port 141 is opened and port 154 is closed, thus opening the vent 144, 146 through port 141 and closing communication between port 94, conduit 152 and chamber 150. This causes chamber 122 of the diaphragm assembly 82 to vent through port 126, conduit 130, port 128, chamber 150, core 134, port 141, port 144, chamber 86 and port 146. The spring 123 then drives the diaphragm 114 together with flange 110 to the left as viewed in FIG. 5, effecting communication between port 92 and port 94. Chamber 30 of power unit 24 then vents through nipple 34, conduit 44, connector 40, conduit 52, port 96, chamber 86 and port 146. Vacuum is applied from source 66 through port 94, as hereinabove described, and chamber 100 to port 92, conduit 46, connector 40, conduit 36, port 32 and chamber 28, drawing diaphragm 22 together with link 20 upwardly, as viewed in FIG. 1, thereby pivoting bell crank lever 14 counterclockwise about pivot point 16 to the retracted shield position shown in FIG. 1.

What is claimed is:

1. A remotely controlled electro-pneumatic valve assembly comprising a pneumatically operated servo valve and a solenoid operated pilot valve, said servo valve including a chamber divided into first and second compartments by a movable wall, said movable wall being operatively connected to a porting valve for selectively controlling fluid flow from a source of fluid pressure to a fluid operated device, said pilot valve being operable to control flow of fluid pressure to said first compartment thereby selectively actuating said porting valve for directing fluid flow in one sense when energized and in another sense when deenergized, said pilot valve including means for porting the fluid pressure to said first compartment when said pilot valve is energized and means for biasing it to a position for venting said first compartment when it is deenergized and auxiliary means for actuating said porting valve comprising a manually operable controller for mechanically moving said porting valve to a position for directing fluid flow in said one sense when said pilot valve is deenergized, said auxiliary means including manually releasable latching means for maintaining said porting valve in said position for directing fluid flow in said one sense until said latching means is manually released.

References Cited

UNITED STATES PATENTS

| 2,273,535 | 2/1942 | Peo | 251—60 |
| 2,340,489 | 2/1944 | Pontius et al. | 251—60 |
| 2,708,091 | 5/1955 | Rim | 251—60 |
| 2,716,425 | 8/1955 | Yarber | 137—625.64 |
| 2,723,537 | 11/1955 | Clark | 251—30 XR |
| 2,916,051 | 12/1959 | Taylor | 137—625.64 |
| 3,126,915 | 3/1964 | Hunt | 137—625.64 XR |
| 3,171,439 | 3/1965 | Lansky et al. | 137—625.64 XR |

HENRY T. KLINKSIEK, Primary Examiner

U.S. Cl. X.R.

251—60, 115

UNITED STATES PATENT OFFICE
CERTIFICATE OF CORRECTION

Patent No. 3,517,698                        June 30, 1970

Raymond A. Deibel et al.

It is certified that error appears in the above identified patent and that said Letters Patent are hereby corrected as shown below:

Column 3, line 45, after "the" insert -- porting valve retainer 102 and the outer wall of the --.

Signed and sealed this 20th day of October 1970.

(SEAL)
Attest:

Edward M. Fletcher, Jr.            WILLIAM E. SCHUYLER, JR.
Attesting Officer                  Commissioner of Patents